J. M. BROOKS.
Cotton-Planters.
No. 135,766.
Patented Feb. 11, 1873.
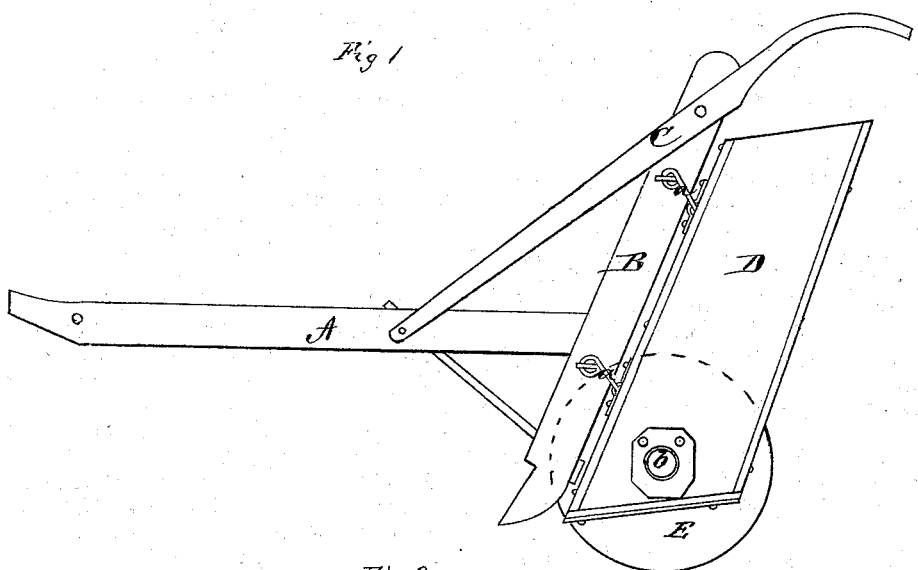
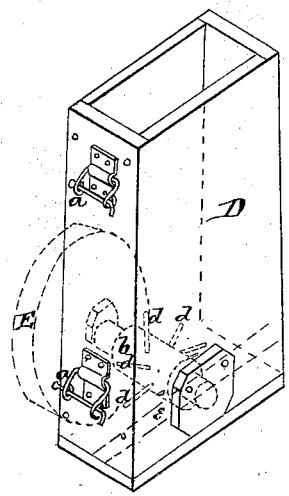

UNITED STATES PATENT OFFICE.

JAMES M. BROOKS, OF WOODBURY, GEORGIA.

IMPROVEMENT IN COTTON-PLANTERS.

Specification forming part of Letters Patent No. 135,766, dated February 11, 1873.

*To all whom it may concern:*

Be it known that I, JAMES M. BROOKS, of Woodbury, in the county of Meriwether and in the State of Georgia, have invented certain new and useful Improvements in a Cotton-Seed Planter; and do hereby declare that the following is a full, clear, and exact description thereof, reference being had to the accompanying drawing and to the letters of reference marked thereon making a part of this specification.

The nature of my invention consists in the construction and arrangement of a cotton-seed planter, as will be hereinafter more fully set forth.

In order to enable others skilled in the art to which my invention appertains to make and use the same, I will now proceed to describe its construction and operation, referring to the annexed drawing, in which—

Figure 1 is a side elevation of my planter, and Fig. 2 is a perspective view of the seed-box.

A represents the beam; B, the standard; and C, the handles of any plow to which my cotton-seed planter may be attached. D represents the seed-box, hinged by means of staples $a\ a$ to the rear side of the plow-standard B, in such a manner that the box can move freely up and down on its hinges, as occasion may require. Through the lower end of the box D passes a shaft, $b$, having upon one end outside of the box a wheel, E, and inside of the box the shaft is provided with radial arms $d\ d$, which, as the shaft is revolved by the wheel running on the ground, agitate the seed and cause the seed to fall through an opening, $e$, in the bottom of the box into the furrow made by the plow in front.

The hinging the seed-box in such a manner that it will be capable of an up-and-down movement is very important, because, when the planter is in operation, if the plow strikes a hard place in the ground it will not prevent the wheel from rolling on the ground, and as long as the wheel revolves or rolls on the ground the seed will be sown; and if the wheel rolls over a rock or clod of dirt it does not interfere with the plow-stock. Thus the wheel will under all circumstances be in contact with and roll on the ground.

Having thus fully described my invention, what I claim as new, and desire to secure by Letters Patent, is—

The combination of the standard B and the seed-box D, hinged thereto at its top and bottom by the staples $a\ a$, so that the box will move up and down on the standard in parallel lines thereto, substantially as set forth.

In testimony that I claim the foregoing I have hereunto set my hand this 26th day of December, 1871.

JAMES M. BROOKS.

Witnesses:
A. A. SNIDER,
S. J. JOINER.